United States Patent
Eckert et al.

(10) Patent No.: US 9,876,353 B2
(45) Date of Patent: Jan. 23, 2018

(54) METHOD AND APPARATUS FOR TRANSMITTING ELECTRICAL POWER

(71) Applicant: Robert Bosch GmbH, Stuttgart (DE)

(72) Inventors: Bernd Eckert, Vaihingen An der Enz (DE); Gisbert Krauter, Burgstetten (DE); Ian Faye, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 381 days.

(21) Appl. No.: 14/436,507

(22) PCT Filed: Sep. 9, 2013

(86) PCT No.: PCT/EP2013/068590
§ 371 (c)(1),
(2) Date: Apr. 17, 2015

(87) PCT Pub. No.: WO2014/060147
PCT Pub. Date: Apr. 24, 2014

(65) Prior Publication Data
US 2016/0172853 A1 Jun. 16, 2016

(30) Foreign Application Priority Data

Oct. 17, 2012 (DE) .................. 10 2012 218 889

(51) Int. Cl.
H02J 3/38 (2006.01)
H02J 3/00 (2006.01)
(Continued)

(52) U.S. Cl.
CPC ............. *H02J 3/00* (2013.01); *B60L 11/1816* (2013.01); *B60L 11/1844* (2013.01);
(Continued)

(58) Field of Classification Search
CPC . H02J 3/00; H02J 3/14; B60L 11/1816; B60L 11/1844; B60L 11/1846
(Continued)

(56) References Cited

U.S. PATENT DOCUMENTS 7,796,412 B2 * 9/2010 Fornage ................ H02M 3/285
323/906
8,089,785 B2 * 1/2012 Rodriguez ........... H02M 7/4807
323/906
(Continued)

FOREIGN PATENT DOCUMENTS

| DE | 202009018108 | 2/2011 |
| GB | 2426878 | 12/2006 |
| WO | 2010108910 | 9/2010 |
| WO | 2010111451 | 9/2010 |
| WO | 2012000538 | 1/2012 |

OTHER PUBLICATIONS

International Search Report for Application No. PCT/EP2013/068590 dated Nov. 5, 2013 (English Translation, 4 pages).

*Primary Examiner* — Ryan Jager
(74) *Attorney, Agent, or Firm* — Michael Best & Friedrich LLP

(57) ABSTRACT

The present invention relates to a method (40) for transmitting electrical power between an energy supply grid (16) and an energy consumer (12) or energy producer (12) which is coupled to the energy supply grid (16), wherein at least one electrical variable of the energy supply grid (16) is detected, wherein a discrepancy between the electrical variable and a rated variable of the energy supply grid (16) which is associated with the electrical variable is determined, wherein the power transmission is controlled on the basis of the discrepancy, and wherein the electrical variable is a mains frequency and/or a mains voltage of the energy supply grid (16) and the rated variable is a rated frequency and/or rated voltage of the energy supply grid (16).

13 Claims, 3 Drawing Sheets

(51) Int. Cl.
*H02J 3/14* (2006.01)
*B60L 11/18* (2006.01)
*H02M 7/00* (2006.01)

(52) U.S. Cl.
CPC .......... *B60L 11/1846* (2013.01); *H02J 3/14* (2013.01); *H02M 7/00* (2013.01); *B60L 2230/22* (2013.01); *B60L 2230/24* (2013.01); *Y02B 70/3225* (2013.01); *Y02E 60/721* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 20/222* (2013.01); *Y04S 20/224* (2013.01); *Y04S 30/14* (2013.01)

(58) Field of Classification Search
USPC .......................................................... 307/52
See application file for complete search history.

(56) References Cited

U.S. PATENT DOCUMENTS

| | | | |
|---|---|---|---|
| 8,674,668 B2 * | 3/2014 | Chisenga | H02M 3/156 323/266 |
| 2004/0254688 A1 * | 12/2004 | Chassin | H02J 3/14 700/295 |
| 2005/0068012 A1 * | 3/2005 | Cutler | H02J 3/383 323/234 |
| 2009/0097283 A1 * | 4/2009 | Krein | H02J 3/1835 363/40 |
| 2010/0156348 A1 * | 6/2010 | Kirchner | H02J 7/042 320/109 |
| 2012/0161704 A1 | 6/2012 | Gaul et al. | |
| 2013/0155735 A1 * | 6/2013 | Ilic | H02M 7/72 363/71 |
| 2014/0169053 A1 * | 6/2014 | Ilic | H02M 7/53873 363/132 |

* cited by examiner

METHOD AND APPARATUS FOR TRANSMITTING ELECTRICAL POWER

The present invention relates to a method for transmitting electrical power between an energy supply grid and an energy consumer or energy generation unit coupled to the energy supply grid.

In addition, the present invention relates to an apparatus for transmitting electrical power between an energy supply grid and an energy consumer or energy generation unit coupled to the energy supply grid.

It is generally known in the field of motor vehicle drive technology to use an electric machine as the only drive or together with a drive motor of another type (hybrid drive). Typically, electrical rotating-field machines to which electrical energy is supplied by an electrical energy store located on board the motor vehicle are used as drive motor in such electric or hybrid vehicles.

In the case of a plug-in hybrid vehicle or in the case of an electric vehicle, the electrical energy store is connected to an electrical grid of an energy provider at certain time intervals or after a certain use time of the vehicle in order to charge the electrical energy store with electrical energy.

In the case of known charging systems for electrically driven motor vehicles, the charging operation takes place without taking into consideration the present load on the supply grid, however. Thus, the power withdrawn is not reduced even in the case of supply grids which are subject to a very high load. If a very large number of consumers are connected to the energy supply grid at the same time (for example many electric cars), this can result in destabilization or, in an extreme case, in (partial) failure of the energy supply grid.

In order to relieve the load on and stabilize a supply grid which is subject to a high load, therefore, a disconnection possibility for chargers in the case of load spikes is demanded by the energy providers.

For this purpose, in known energy transmission systems, for example, the so-called ripple control technique is used. In the case of the ripple control technique, control commands are transmitted via the available power supply grid in order to be able to correspondingly control the electrical consumer. The transmission of the control commands takes place by pulse trains in the frequency range of 110 Hz up to approximately 2000 Hz, which are superimposed on the mains voltage with an amplitude of approximately 1% to 4% of the respective rated voltage. A special receiver which filters the pulse trains out of the supply grid again, and derives the desired control information from this, is connected upstream of the energy consumer. Selective load shedding of less important grid loads can be realized with the aid of the control commands in order to prevent collapse of the grid in the case of heavy loading.

Similarly, the ripple control technique can also be used for controlling relatively small energy generation units, such as photovoltaic systems, for example. Since the generation and consumption of electrical energy in an electrical energy distribution grid should correspond to one another at any given time, the feed-in power of such decentralized systems is reduced in the case of a surplus of electrical energy. In a surplus supply situation, a feed-in power limitation signal is accordingly transmitted to the decentralized energy generation units in order thus to gradually reduce the fed-in power. In order to evaluate the ripple control signals, the decentralized energy generation systems also need to be provided with corresponding receivers.

DE 20 2009 018 108 discloses an inverter for the decentralized feeding of electrical energy into a public AC grid. The inverter has a receiver for a centrally transmitted feed-in power limitation signal and a controller, which limits the feed-in power of the inverter depending on the feed-in power limitation signal to a preset degree.

One disadvantage in the case of the known energy transmission systems consists in that special transmitters/receivers for the generation/evaluation of the ripple control signals are required. This results in a technically complex solution and requires high levels of investment in information and communication technology.

SUMMARY OF THE INVENTION

The present invention therefore provides a method for transmitting electrical power between an energy supply grid and an energy consumer or energy generation unit coupled to the energy supply grid, wherein at least one electrical variable of the energy supply grid is detected, wherein a discrepancy between the electrical variable and a rated variable of the energy supply grid assigned to the electrical variable is determined, wherein the power transmission is controlled on the basis of the discrepancy, and wherein the electrical variable is a line frequency and/or a mains voltage of the energy supply grid, and the rated variable is a rated frequency and/or rated voltage of the energy supply grid.

In addition, the present invention provides an apparatus for transmitting electrical power between an energy supply grid and an energy consumer or energy generation unit coupled to the energy supply grid, wherein the apparatus has a detection unit for detecting at least one electrical variable of the energy supply grid, an evaluation unit for determining a discrepancy between the electrical variable and a rated variable of the energy supply grid assigned to the electrical variable, and a control unit, which is designed to control the power transmission on the basis of the discrepancy, wherein the electrical variable is a line frequency and/or a mains voltage of the energy supply grid, and the rated variable is a rated frequency and/or rated voltage of the energy supply grid.

In the case of the apparatus according to the invention or in the case of the method according to the invention, the power transmission is controlled depending on a determined discrepancy between the electrical variable and the rated variable. The electrical variable can be measured directly at the electrical supply grid or can be determined by observation or calculation from other variables. A line frequency and/or a mains voltage of the energy supply grid is/are detected as electrical variable. In this case, in one embodiment primarily the line frequency can be detected since, on the basis of this line frequency, it is possible to make a reliable statement regarding the total loading of the energy supply grid. The measured mains voltage can be used additionally for verifying the decisions made on the basis of the frequency evaluation.

In an alternative embodiment, it is also possible for only the mains voltage to be evaluated, wherein the transmitted power is reduced if a voltage dip on the grid is identified, for example.

Owing to the present invention, it is possible to dispense with a complex and involved communication structure for the control of the power transmission. This simplifies the design of the energy consumer/generation unit and thus results in a less expensive overall solution.

It is particularly preferred if a control range between a first and a second threshold value for the electrical variable is defined in which the power transmission is changed on the basis of the discrepancy of the electrical variable, wherein the rated variable is outside the control range.

In this embodiment, a control range is fixed in which the power transmission is matched to the present grid capacity utilization. If the determined electrical variable has a smaller discrepancy than in the control range (i.e. the determined variable fluctuates approximately within a region of the rated variable), the power transmission is continued unchanged, for example (for example the electrical energy store of the electric vehicle can be charged at full power in this operating situation).

In a further embodiment, the transmitted power in the control range is decreased continuously as the discrepancy between the electrical variable and the rated variable increases.

If the determined electrical variable is fluctuated within the control range, either an overloaded or oversupplied energy supply grid is present, depending on the type of operation (energy consumer/energy generation unit). Therefore, the power transmission needs to be reduced in order to stabilize the electrical grid. The decrease takes place in this case continuously in order not to additionally destabilize the energy supply grid owing to a sudden disconnection of a number of chargers, for example.

In accordance with a further embodiment, the transmitted power in the control range is increased continuously as the discrepancy between the electrical variable and the rated variable decreases.

As soon as the electrical variable draws close to the rated variable and the electrical grid is therefore stabilized again, the transmitted power can be increased. This also takes place continuously in order to couple an energy consumer, for example, into the energy supply grid whilst providing as much protection as possible (for example along a ramp function).

In a further embodiment, the power transmission is interrupted in the event of discrepancies of the electrical variable which exceed the control range.

If the electrical variable has a greater discrepancy than in the control range, the power transmission is interrupted in order to enable stabilization of the electrical grid.

In one embodiment, the electrical variable in the control range can be decreased in such a way that the energy transmission for the greatest discrepancy in the control range is interrupted. In other words, the transmitted power is decreased continuously to the value of zero in the control range.

In an alternative embodiment, the transmitted power can be decreased to a predefined value, which is then maintained in the event of discrepancies which exceed the control range, for example.

In accordance with a further embodiment, a second control range between a third and a fourth threshold value for the electrical variable is defined in which the power transmission is changed on the basis of the electrical variable, wherein the rated variable is between the second control range and the first control range.

In this embodiment, a second control range is fixed in which the power transmission is likewise adapted depending on the determined discrepancy between the electrical variable and the rated variable. However, this is a different operating situation than in the first control range. On connection of an energy consumer to the energy supply grid, an operating situation in which an oversupplied energy supply grid is present is covered by the second control range, for example. If such an oversupply is identified, the charging power of the energy consumer is increased above a rated value. Thus, for example, relatively high feed-in powers of decentralized energy generation systems can be utilized. The electrical grid is kept in a stable and balanced state.

In a further embodiment, the transmitted power in the second control range is increased continuously as the discrepancy between the electrical variable and the rated variable increases.

The transmitted power is increased continuously in the second control range in order to not effect any destabilization of the electrical grid, for example, by a plurality of electrical loads suddenly being run up to a higher power consumption. In this case, the transmitted power is advantageously limited to a predefined maximum value.

In the case of relatively small discrepancies of the electrical variable, i.e. in the case of discrepancies between the rated variable and the second control range, the energy generation unit/consumer is operated at a rated value for the power transmission, for example.

In a further embodiment, the transmitted power in the second control range is decreased continuously as the discrepancy between the electrical variable and the rated variable decreases.

As soon as the electrical variable draws close to the rated variable again, the transmitted power is decreased continuously in order to maintain the stable/balanced state of the energy supply grid in relation to the energy balance within the electrical grid.

In accordance with a further embodiment, the threshold values for the electrical variable are fixed on the basis of the rated variable.

The threshold values for the first and second control ranges are set depending on the determined rated variable (for example 50 Hz/60 Hz supply grid) and the type of operation (energy generation unit/energy consumer). Thus, the control of the power transmission can be matched precisely to the present operating situation.

In a further embodiment, the rated variable is determined on the basis of the detected electrical variable.

For example, a charger connected to the energy supply grid can automatically identify, by means of a frequency measurement, whether the charger is being operated on a 50 Hz grid or on a 60 Hz grid. Depending on this, the rated variable and the corresponding threshold values are fixed. Thus, no manual configuration of the energy generation unit/consumer is required. Possible erroneous configurations can be ruled out. As a result, very simple handling of the energy generation unit/consumer is made possible.

In a further embodiment, the power is transmitted from the energy supply grid to the energy consumer, and the first control range is defined below the rated variable.

By virtue of this measure, an overload of the energy supply grid is identified in the event of a drop in the line frequency, for example. Accordingly, the power consumed by the charger is reduced continuously in order to counteract the overload.

The second control range is fixed above the rated variable in this type of operation. Thus, the charger can draw more power in the event of a surplus of electrical energy, for example, and thus reproduce the equilibrium of generated and consumed electrical energy within the energy supply grid.

In a further embodiment, the power is transmitted from the energy generation unit to the energy supply grid, and the first control range is defined above the rated variable.

A photovoltaic system or a feed-in inverter can be used as energy generation unit, for example. In this embodiment, the fact of there being an oversupply in the electrical grid is derived from an increased line frequency and/or mains voltage. Correspondingly, the fed-in power is reduced continuously by the energy generation unit depending on the values for the line frequency and/or mains voltage.

In a further embodiment, the control of the power transmission is switched off on the basis of an operating condition of the power transmission.

If, for example, an energy consumer is operated in an island grid (for example diesel generator, wind power etc.), the power reduction of the energy consumer can be switched off in order to avoid oscillation with the frequency regulation of the generator.

Island grids on the basis of an emergency power operating mode (standby generation units) are generally operated at a frequency which differs markedly from the rated frequency (for example 47 Hz) in order to ensure that energy generation units (such as photovoltaic systems, for example) remain switched off. Thus, the energy consumer can alternatively be switched into a defined standby generation operating mode with predefined parameters if the discrepancy of the line frequency exceeds a further threshold value.

In a particularly preferred embodiment of the apparatus, a control range between a first and a second threshold value of the electrical variable is defined, wherein the rated variable is outside the control range, and wherein the control unit is designed to decrease the transmitted power in the control range continuously as the discrepancy between the electrical variable and the rated variable increases.

By virtue of this measure, the energy consumers/generation units can respond automatically to the present capacity utilization situation in the energy supply grid. Involved or cost-intensive investment in the information and communication structure of the energy supply grid can be avoided. Furthermore, the control according to the invention of the power transmission can be used in the already existing energy supply grids since electrical variables only need to be detected at the grid connection of the energy consumer/generation unit. Thus, using very simple means (for example new software in a charger), highly efficient load relief for the grid in the case of load peaks in the energy supply grid can be achieved.

It goes without saying that the features, properties and advantages of the method according to the invention are also relevant correspondingly to or applicable to the apparatus according to the invention.

DETAILED DESCRIPTION

Figure 1:
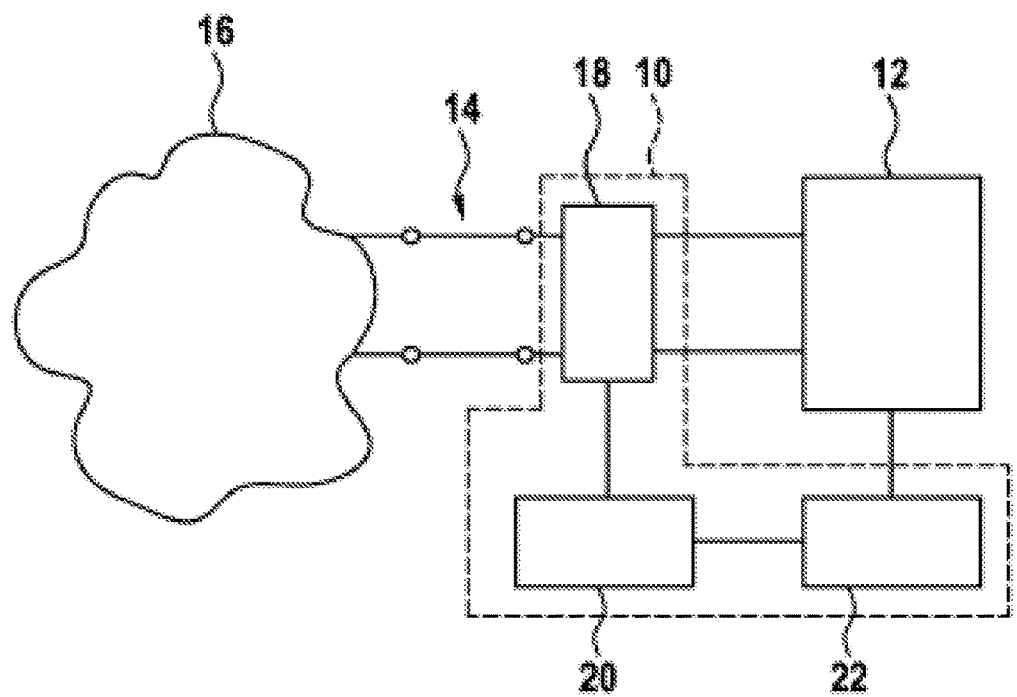
FIG. 1 shows a schematic view of an apparatus for transmitting electrical power between an energy supply grid and an energy consumer/energy generation unit coupled to the energy supply grid.

FIG. 1 shows a schematic view of an apparatus 10 for transmitting electrical power between an energy consumer/energy generation unit 12, which is connected to a low-voltage grid 14, and an energy supply grid 16. The low-voltage grid 14 is in this case understood to be part of the energy supply grid 16 which is used for distributing the electrical energy to the electrical end consumers. In central Europe, a low-voltage grid is generally operated on voltages of between 230 V/400 V (single-phase/three-phase) up to 1000 V. In order to avoid voltage losses, low-voltage grids are restricted in terms of their physical extent to a range of a few hundred meters up to a few kilometers. Therefore, the regional low-voltage grids are fed from a superordinate medium-voltage grid via transformer stations.

The apparatus 10 serves the purpose of matching the power transmission between the energy consumer/energy generation unit 12 and the energy supply grid 16 to the present capacity utilization situation of the energy supply grid 16. For this purpose, the apparatus 10 has a detection unit 18, by means of which at least one electrical variable of the low-voltage grid 14 is detected. A line frequency and/or a mains voltage of the low-voltage grid 14, for example, can be determined as electrical variable.

Furthermore, the apparatus 10 has an evaluation unit 20 and a control unit 22. The detected line frequency and/or mains voltage of the low-voltage grid 14 is/are passed onto the evaluation unit 20 for evaluation of the capacity utilization situation of the energy supply grid 16. Thus, for example, the line frequency is a reliable indicator of the loading on the energy supply grid 16. In the case of an overloaded energy supply grid 16, the line frequency falls below a rated frequency of the energy supply grid 16. At the same time, in the case of a high load on the energy supply grid 16, the mains voltage also decreases. Thus, the mains voltage can additionally be used, for example, for verification of the decisions made on the basis of the frequency evaluation. The evaluation unit 20 determines the discrepancies between the electrical variables and the corresponding rated variables and passes these discrepancies onto the control unit 22, if appropriate. The control unit 22 is designed to control or to change the power transmission between the energy consumer/energy generation unit 12 and the energy supply grid 16 on the basis of the discrepancies. Therefore, the power transmission can be matched to an oversupply or overloading of the energy supply grid 16 without a complex information and communication structure needing to be used for this purpose. The transmitted power is only set depending on an evaluation of electrical variables of the grid connection. As a result, the complexity of the entire system is reduced.

Figure 2:
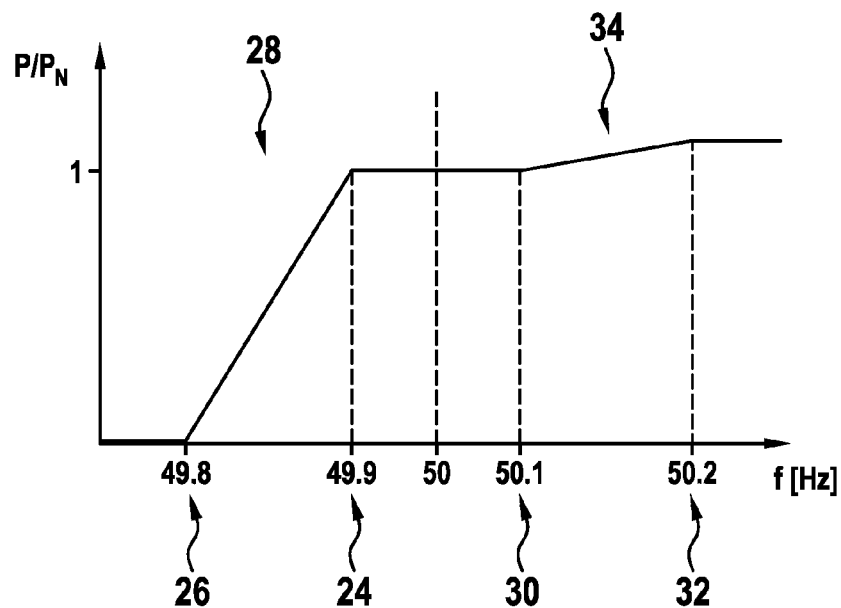
FIG. 2 shows a graph illustrating a power characteristic of the energy consumer as a function of a line frequency of the energy supply grid.
Figure 3:
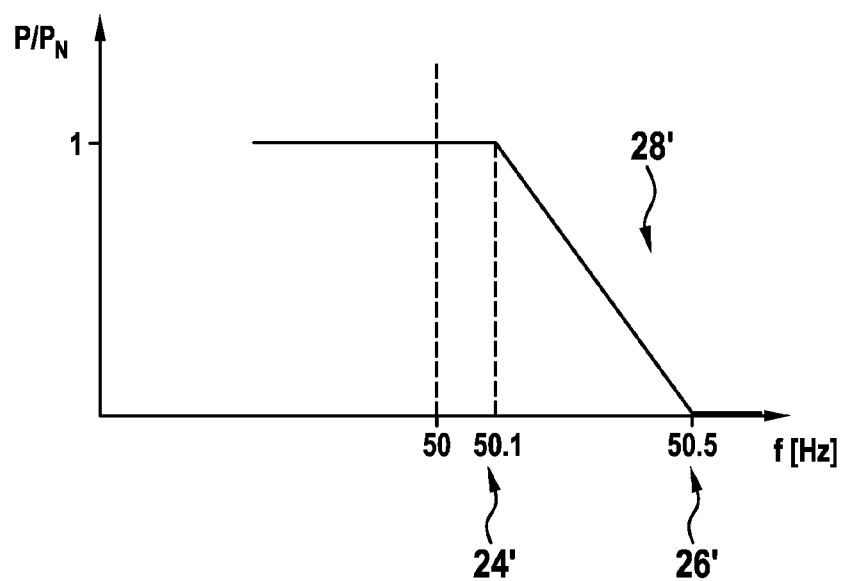
FIG. 3 shows a graph illustrating a power characteristic of the energy generation unit as a function of the line frequency of the energy supply grid.

The control of the power transmission will be explained in detail below with reference to FIGS. 2 and 3. In this regard, the line frequency of the low-voltage grid 14 is plotted in hertz on the respective x axes in FIGS. 2 and 3. The respective y axis gives the transmitted power, which is standardized to a rated value of the transmitted power, wherein the rated value relates to the respectively connected energy consumer/energy generation unit 12. In this case, FIG. 2 illustrates an exemplary profile of the transmitted power for the case where the energy consumer 12 is connected to the energy supply grid 16. Similarly, FIG. 3 shows the power profile for the connected energy generation unit 12, which feeds power into the energy supply grid 16. In both cases (FIG. 2—energy consumer 12; FIG. 3—energy generation unit 12) it will be assumed that the energy supply grid 16 or the low-voltage grid 14 is initially being operated on a rated frequency of 50 Hz.

The power characteristic for the control of the energy consumer 12 shown in FIG. 2 will first be explained in more detail below. In the present case, the energy consumer 12 is a charger 12, for example, which is coupled to a traction battery of an electrically operated motor vehicle. For controlling the charging power for the traction battery 12, a first threshold value 24 is defined at a frequency of 49.9 Hz and a second threshold value 26 is defined at a frequency of 49.8 Hz. The range between these two threshold values 24, 26 forms a first control range 28 for the transmitted charging power.

In the present example, the line frequency of the low-voltage grid 14 or the energy supply grid 16 is detected by means of the detection unit 18. If the line frequency has lower values than 50 Hz, an overloaded energy supply grid 16 is present. In contrast, the energy supply grid 16 is oversupplied if the line frequency is greater than 50 Hz. In order to evaluate the measured line frequency, this line frequency is passed onto the evaluation unit 20. The evaluation unit 20 compares the measured line frequency with the threshold values 24, 26. If the determined line frequency fluctuates within a range between the rated variable (50 Hz) and the first threshold value (49.9 Hz), the traction battery is charged further with the rated power. If the line frequency is in the first control range 28, however, the determined discrepancy of the line frequency is passed onto the control unit 22. The control unit 22 controls the charger 12 such that the charging power is decreased continuously as the discrepancy between the line frequency and the rated frequency increases. Advantageously, the charging power is decreased in such a way that it is reduced to the value zero in the case of the second threshold value 26. Therefore, the power transmission to the traction battery is interrupted for discrepancies of the line frequency which exceed the second threshold value 26. With the aid of the continuous reduction in the power in the control range 28, soft load relief for the energy supply grid 16 is achieved without instabilities in the energy supply grid 16 being generated.

Therefore, the charger 12 can automatically respond to load peaks on the energy supply grid 16 with a reduction in power. Involved investment in the information and communication structure is avoided.

Alternatively, there is also the possibility of the charger 12 feeding power from the traction battery into the energy supply grid 16 if there is an overloaded energy supply grid 16. For this purpose, it is necessary for the charger 12 to have a feed-in apparatus.

If a line frequency is determined which has a greater value than the rated frequency, this indicates an oversupplied energy supply grid 16. In order to control the power transmission in the case of an oversupplied energy supply grid 16, a third threshold value 30 and a fourth threshold value 32 are fixed, which define a second control range 34. In the case of a measured line frequency between the rated frequency (50 Hz) and the third threshold value 30 (50.1 Hz), the battery is charged further with the rated power. If the detected line frequency fluctuates within the second control range 34, however, the determined discrepancy is passed onto the control unit 22. The control unit 22 controls the charger 12 in such a way that the charging power is increased continuously as the discrepancy between the line frequency and the rated frequency increases. With this increase in power withdrawal, an oversupply in the energy supply grid 16 can be counteracted. For example, solar systems which feed energy into the energy supply grid 16 can trigger such an oversupply in the energy supply grid 16 at a time of intensive solar radiation. This effects an increase in the mains voltage and the line frequency. Owing to the increase in the charging power, the equilibrium between the fed-in and withdrawn power on the energy supply grid 16 can be reproduced.

As the determined line frequency approaches the rated frequency of 50 Hz, the transmitted power is increased (first control range 28) or decreased (second control range 34) continuously back to the rated power.

In the above-described exemplary embodiment, the control of the charging power is performed on the basis of the detected line frequency alone. In addition, however, the mains voltage of the low-voltage grid 14 can also be detected in order to verify the charging power setting determined on the basis of the line frequency. In an alternative embodiment, it is also possible for only the mains voltage of the low-voltage grid 14 to be detected and for the charging power of the charger 12 to be controlled on the basis of this. For this purpose, similarly to the above-described exemplary embodiment, a plurality of voltage threshold values are fixed which define a corresponding first and second control range. In this case, the transmitted power is likewise matched continuously in order to avoid negative feedback on the grid, for example as a result of a sudden disconnection of the charger 12.

The setting of the transmitted power is advantageously performed with slow regulation in order to suppress unintentional upswing effects.

The principle described in relation to FIG. 2 in respect of the power control can be applied similarly to an energy generation unit 12, in this case to a feeding inverter 12. The corresponding power characteristic is illustrated in FIG. 3. Since with this type of operation power is fed into the energy supply grid 16, the first control range 28' is defined in a range above the line frequency 50 Hz between the first threshold value 24' (50.1 Hz) and the second threshold value 26' (50.5 Hz).

At line frequencies below the first threshold value 24', the inverter 12 feeds a rated power into the energy supply grid 16. As soon as the evaluation unit 20 identifies a discrepancy of the line frequency in the first control range 28', this is passed onto the control unit 22. The control unit 22 controls the inverter 12 in such a way that the fed-in power is decreased to a value of zero continuously corresponding to the power characteristic illustrated by way of example in FIG. 3 as the discrepancy between the line frequency and the rated frequency increases. In the event of discrepancies which exceed the second threshold value, the feed of power is interrupted by means of the inverter 12. Thus, the oversupply in the energy supply grid 16 can be counteracted.

In an alternative embodiment, the power can also be decreased to a value which is not equal to zero in the event of the second threshold value 26' being reached. However, this value should be selected such that the oversupply on the energy supply grid 16 can be reduced effectively.

Similarly to the exemplary embodiment shown in FIG. 2, the fed-in power of the inverter 12 is changed continuously in order to avoid destabilization and/or upswing effects in the energy supply grid 16.

Furthermore, in addition or as an alternative, the mains voltage can be evaluated for controlling the fed-in power of the inverter 12.

Figure 4:
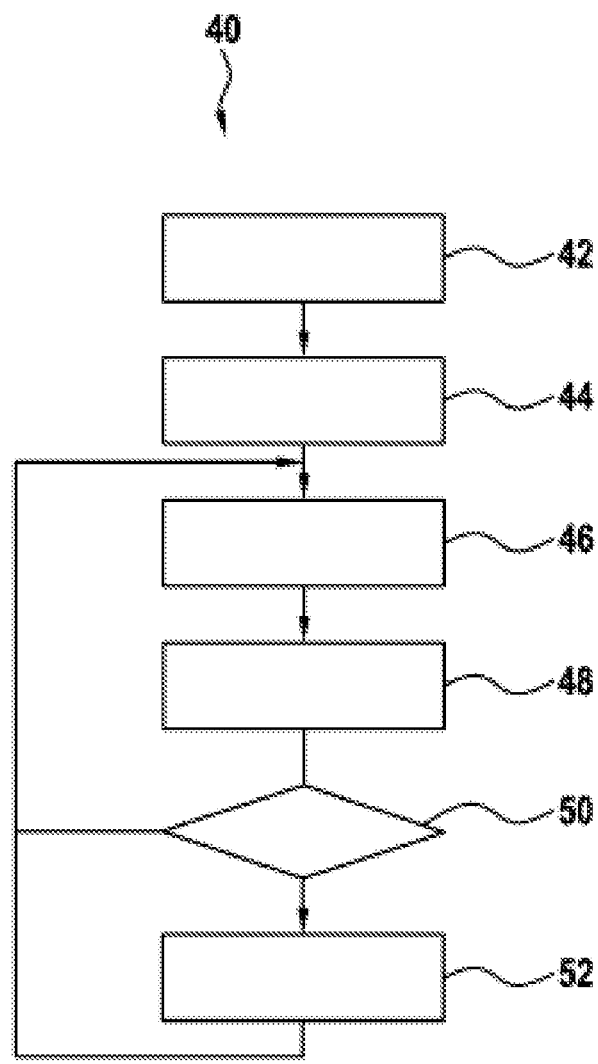
FIG. 4 shows a diagram explaining an embodiment of a method according to the invention.

FIG. 4 shows a diagram for explaining an embodiment of a method 40 according to the invention. In particular, the method 40 serves to control the power transmission between the energy supply grid 16 and the energy consumer/energy generation unit 12 coupled to the energy supply grid 16. For the explanation of the method 40, it will be assumed again that the charger 12 is coupled to the energy supply grid 16.

In a step 42, first the line frequency of the low-voltage grid 14 is detected. From this line frequency, the charger 12 automatically identifies whether the charger 12 is being operated on a grid with a rated frequency of 50 Hz, or 60 Hz, for example. Once the rated frequency of the low-voltage grid 14 has been determined, in a step 44 the threshold values 24, 26, 30, 32 are fixed depending on the rated frequency. Thus, the control ranges 28, 34 are also defined.

Then, in a step 46, the line frequency and/or the mains voltage of the low-voltage grid 14 are detected. For the further description of the method 40, it will be assumed that the line frequency forms the primary variable for the power control and that the mains voltage is used merely for verification purposes. Alternatively, however, the control of the transmitted power can also take place only on the basis of the line frequency or also only on the basis of the mains voltage.

In a step 48, the discrepancy between the line frequency and the rated frequency is determined.

In a step 50, a check is then performed to ascertain whether this discrepancy of the line frequency is within the first control range 28 or the second control range 34. If this is not the case, the detection of the line frequency and/or the mains voltage is continued in step 46. The transmitted power is not changed.

If the discrepancy is within one of the control ranges 28, 34, however, in a step 52 the operating situation determined on the basis of the line frequency (overloaded grid/oversupplied grid) is verified with the aid of the measured mains voltage. If the verification is positive (i.e. for example, a lower mains voltage is also measured in the case of a lower line frequency), the charging power of the charger 12 is matched corresponding to the power characteristic. In the case of a negative variation, a plurality of possibilities are conceivable. For example, in the case of a negative verification, a different power characteristic can be used than in the case of a positive verification. Alternatively, the negative verification can also be evaluated only for statistical purposes. The power of the charger 12 is then set independently of the verification. In a further alternative embodiment, a negative verification can result in the transmitted power being maintained unchanged.

The method 40 according to the invention or the apparatus 10 according to the invention can be used, for example, in electric vehicles or plug-in hybrid vehicles which are recharged using chargers on AC grids. In addition, the proposed power control can also be used in the case of all other stationary electrical consumers in which no continuous power consumption is required. Examples of such electrical consumers can be stationary battery packs, emergency power supplies, ovens, circulating pumps etc. For the case where energy is fed into the energy supply grid 16, the solution according to the invention can be used in photovoltaic inverters or wind power inverters, for example.

Owing to the evaluation of electrical variables of the connection to the grid, the various energy consumers/energy generation units do not need to be equipped with complex communications technology in order to match the transmitted power to the capacity utilization situation of the energy supply grid.

The invention claimed is:

1. A method for transmitting electrical power between an energy supply grid and an energy consumer or energy generation unit coupled to the energy supply grid, the method comprising:
   detecting a line frequency of the energy supply grid,
   measuring a mains voltage of the energy supply grid,
   determining a discrepancy between the line frequency and a rated frequency of the energy supply grid which is assigned to the line frequency,
   defining a control range between a first and a second threshold value for the line frequency, the rated frequency being outside the control range,
   controlling the power transmission within the control range on the basis of the discrepancy, and
   when the discrepancy exceeds the control range, interrupting the power transmission on the basis of the measured mains voltage.

2. The method as claimed in claim 1, wherein the transmitted power in the control range is decreased continuously as the discrepancy increases.

3. The method as claimed in claim 1, wherein the transmitted power in the control range is increased continuously as the discrepancy decreases.

4. The method as claimed in claim 1, wherein a second control range between a third and a fourth threshold value for the line frequency is defined in which the power transmission is changed on the basis of the line frequency, wherein the rated frequency is between the second control range and the first control range.

5. The method as claimed in claim 4, wherein the transmitted power in the second control range is increased continuously as the discrepancy increases.

6. The method as claimed in claim 4, wherein the transmitted power in the second control range is decreased continuously as the discrepancy decreases.

7. The method as claimed in claim 1, wherein the threshold values for the line frequency are fixed on the basis of the rated frequency.

8. The method as claimed in claim 1, wherein the rated frequency is determined on the basis of the detected line frequency.

9. The method as claimed in claim 1, wherein the power is transmitted from the energy supply grid to the energy consumer, and wherein the first control range is defined below the rated frequency.

10. The method as claimed in claim 1, wherein the power is transmitted from the energy generation unit to the energy supply grid, and wherein the first control range is defined above the rated frequency.

11. The method as claimed in claim 1, wherein the control of the power transmission is switched off on the basis of an operating condition of the power transmission.

12. An apparatus for transmitting electrical power between an energy supply grid and an energy consumer or energy generation unit coupled to the energy supply grid, the apparatus comprising:
   a detection unit for detecting a line frequency of the energy supply grid and a mains voltage of the energy supply grid,
   an evaluation unit for determining a discrepancy between the line frequency and a rated frequency of the energy supply grid assigned to the line frequency, and
   a control unit configured to
      define a control range between a first and a second threshold value for the line frequency, the rated frequency being outside the control range,
      control the power transmission within the control range on the basis of the discrepancy, and
      when the discrepancy exceeds the control range, interrupting the power transmission on the basis of the measured mains voltage.

13. The apparatus as claimed in claim 12, wherein a control range between a first and a second threshold value of the line frequency is defined, wherein the rated frequency is outside the control range, and wherein the control unit is designed to decrease the transmitted power in the control range continuously as the discrepancy increases.

\* \* \* \* \*